US012306896B2

(12) United States Patent
Lenzner (10) Patent No.: US 12,306,896 B2
(45) Date of Patent: May 20, 2025

(54) AUTOMATIC LAYOUT ANOMALY DETECTION FOR WEBSITE LOCALIZATION

(71) Applicant: Salesforce, Inc., San Francisco, CA (US)

(72) Inventor: Marcus Lenzner, Stadroda (DE)

(73) Assignee: Salesforce, Inc., San Francisco, CA (US)

( * ) Notice: Subject to any disclaimer, the term of this patent is extended or adjusted under 35 U.S.C. 154(b) by 166 days.

(21) Appl. No.: 17/695,277

(22) Filed: Mar. 15, 2022

(65) Prior Publication Data

US 2023/0297638 A1 Sep. 21, 2023

(51) Int. Cl.
```
G06F 16/957    (2019.01)
G06F 16/958    (2019.01)
G06F 40/106    (2020.01)
G06F 40/51     (2020.01)
G06F 40/58     (2020.01)
```

(52) U.S. Cl.
CPC ........ *G06F 16/9577* (2019.01); *G06F 16/958* (2019.01); *G06F 40/106* (2020.01); *G06F 40/51* (2020.01); *G06F 40/58* (2020.01)

(58) Field of Classification Search
CPC ...... G06F 16/958; G06F 40/58; G06F 40/106; G06F 16/9577; G06F 40/51
See application file for complete search history.

(56) References Cited

U.S. PATENT DOCUMENTS

| | | | |
|---|---|---|---|
| 6,964,014 B1 * | 11/2005 | Parish | G06F 16/958 715/255 |
| 8,756,050 B1 | 6/2014 | Slutsker et al. | |
| 2006/0217954 A1 | 9/2006 | Koyama et al. | |
| 2007/0033520 A1 * | 2/2007 | Kimzey | G06F 9/454 715/255 |

(Continued)

FOREIGN PATENT DOCUMENTS

WO    WO-2013075332 A1 *   5/2013   .......... G06F 17/2211

OTHER PUBLICATIONS

Alameer et al., "Detecting and localizing internationalization presentation failures in web applications." 2016 IEEE International Conference on Software Testing, Verification and Validation (ICST). IEEE (Year: 2016).*

*Primary Examiner* — Samuel G Neway
(74) *Attorney, Agent, or Firm* — Sterne, Kessler, Goldstein & Fox P.L.L.C.

(57) ABSTRACT

Disclosed herein are system, method, and computer program product embodiments for automatically detecting layout shifts or anomalies in a website during localization processes. A method includes generating a first rendering of a localization element on a website, extracting localized text from a localization descriptor for the localization element in code for the website, applying the localized text to the localization element on the website, generating a second rendering of the localization element on the website after the applying of the localized text, identifying an anomaly in the localization element displayed on the website by comparing the first and second renderings, and creating a visual indicator for display as an overlay outside a visible area of the website, wherein a location of the visual indicator corresponds to a location of the anomaly in the localization element displayed on the website.

20 Claims, 4 Drawing Sheets

(56) References Cited

U.S. PATENT DOCUMENTS

| | | |
|---|---|---|
| 2007/0233456 A1 | 10/2007 | Kim |
| 2008/0281578 A1 | 11/2008 | Kumaran et al. |
| 2009/0157381 A1 | 6/2009 | Furuuchi et al. |
| 2009/0158137 A1 | 6/2009 | Ittycheriah et al. |
| 2010/0305940 A1 | 12/2010 | Dendi et al. |
| 2010/0324887 A1 | 12/2010 | Dong et al. |
| 2012/0017146 A1 | 1/2012 | Travieso et al. |
| 2012/0159430 A1 | 6/2012 | Waldbaum et al. |
| 2013/0006603 A1 | 1/2013 | Zavatone et al. |
| 2014/0172408 A1 | 6/2014 | Vukosavljevic et al. |
| 2015/0067605 A1 | 3/2015 | Zambetti et al. |
| 2015/0324336 A1* | 11/2015 | Glezos .................. G06F 40/58 715/234 |
| 2018/0165987 A1 | 6/2018 | Montiel |
| 2018/0300218 A1* | 10/2018 | Lipka ..................... G06F 40/40 |
| 2018/0329801 A1* | 11/2018 | McKee ............... G06F 11/3624 |
| 2019/0228058 A1* | 7/2019 | Shang .................. G06F 16/986 |
| 2020/0019583 A1* | 1/2020 | Halfond ............... G06F 40/109 |
| 2020/0250208 A1* | 8/2020 | Lipka ................... G06F 40/134 |
| 2021/0004527 A1 | 1/2021 | Chowaniec et al. |
| 2021/0073340 A1 | 3/2021 | Agarwal et al. |
| 2021/0279399 A1 | 9/2021 | Bikumala et al. |
| 2021/0312141 A1 | 10/2021 | Shi et al. |
| 2022/0327279 A1* | 10/2022 | Long ..................... G06F 40/106 |
| 2023/0297638 A1* | 9/2023 | Lenzner ................ G06F 16/958 704/2 |
| 2023/0297764 A1 | 9/2023 | Lenzner |

* cited by examiner

AUTOMATIC LAYOUT ANOMALY DETECTION FOR WEBSITE LOCALIZATION

CROSS-REFERENCE TO RELATED APPLICATION

This application is related to U.S. patent application Ser. No. 17/695,107 by Marcus Lenzner, entitled "Non-Obtrusive Markup Augmentation for Website Localization" filed on May 15, 2022, the disclosure of which is incorporated by reference herein in its entirety.

BACKGROUND

Localization refers to the adaptation of a product, application, website, or document content to meet the language, cultural and other requirements of a specific target market. In some cases, customers may use business management systems and tools to sell products and manage a web store through a website. Such business management systems and tools may need to be localized for use by customers who are located throughout the world and speak different languages.

Current tools for localization might not allow users (e.g., translators or developers performing the translations) to observe how a translation may affect the layout and appearance of a website before implementation of the translation. In some cases, current methods might prevent translators from recognizing the visual impact of a translation displayed on a website and how translations of different languages impose different lengths of texts, which can distort or cause anomalies in the layout of a website.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

Provided herein are system, apparatus, device, method and/or computer program product embodiments, and/or combinations and sub-combinations thereof, for automatically detecting layout shifts or anomalies in a website during localization processes.

Current business management tools and corresponding websites are localized by extracting text from the application, transforming the text into a particular format (e.g., property files, resource bundles, XML, files, etc.) and sending the formatted information to the translation agencies. The translation agencies translate the text from the formatted information into different languages, and pass back the bundles with the translations, which are supplied to the business management tools and corresponding websites before being processed and implemented in the system.

Such tools and methods may prevent translators from double-checking translated text and observing the effects of a translated text prior to ingestion into the system and display on the website. Additionally, current tools for localization might prevent translators from recognizing the visual impact of a translation displayed on a website and how a translation may disrupt the display of the web page. Different languages impose different lengths of texts, which can distort the layout of a page. In some cases, additional line breaks may occur or entire sections of a page may shift due to a further need for more space for the revised/translated texts. Identifying these effects on a webpage may be time consuming, especially if multiple languages in multiple recurring translation iterations are involved. Thus, there may be a need for systems and methods to improve the localization processes and user experiences for performing the translation by automatically detecting anomalies in order to enhance review processes and prevent website disruptions or a broken layout resulting from an unsatisfactory localization.

Aspects of the present disclosure provide technical solutions for automatically detecting layout shifts or anomalies in a website during localization processes. Disclosed aspects relate to technical solutions for providing automatic layout anomaly detection in websites by using image analysis, browser render output analysis, and data comparison tools for analyzing text lengths across multiple localized variants of a webpage to identify localization-impacted website changes before a translator reviews the webpage. Disclosed aspects may also provide visual indicators to translators or reviewers when performing final validations of localized texts on websites.

Aspects of the disclosure can be implemented in the context of any computer-implemented system including a database system, a multi-tenant environment, or the like. Moreover, aspects of the disclosure can be implemented using two or more separate and distinct computer-implemented systems that cooperate and communicate with one another. Aspects of the disclosure can be implemented in numerous ways, including as a process, a method, an apparatus, a system, a device, a non-transitory computer readable medium such as a computer readable storage medium that stores computer readable instructions or computer program code, or as a computer program product comprising a computer usable medium having a computer readable program code embodied therein.

Figure 1:
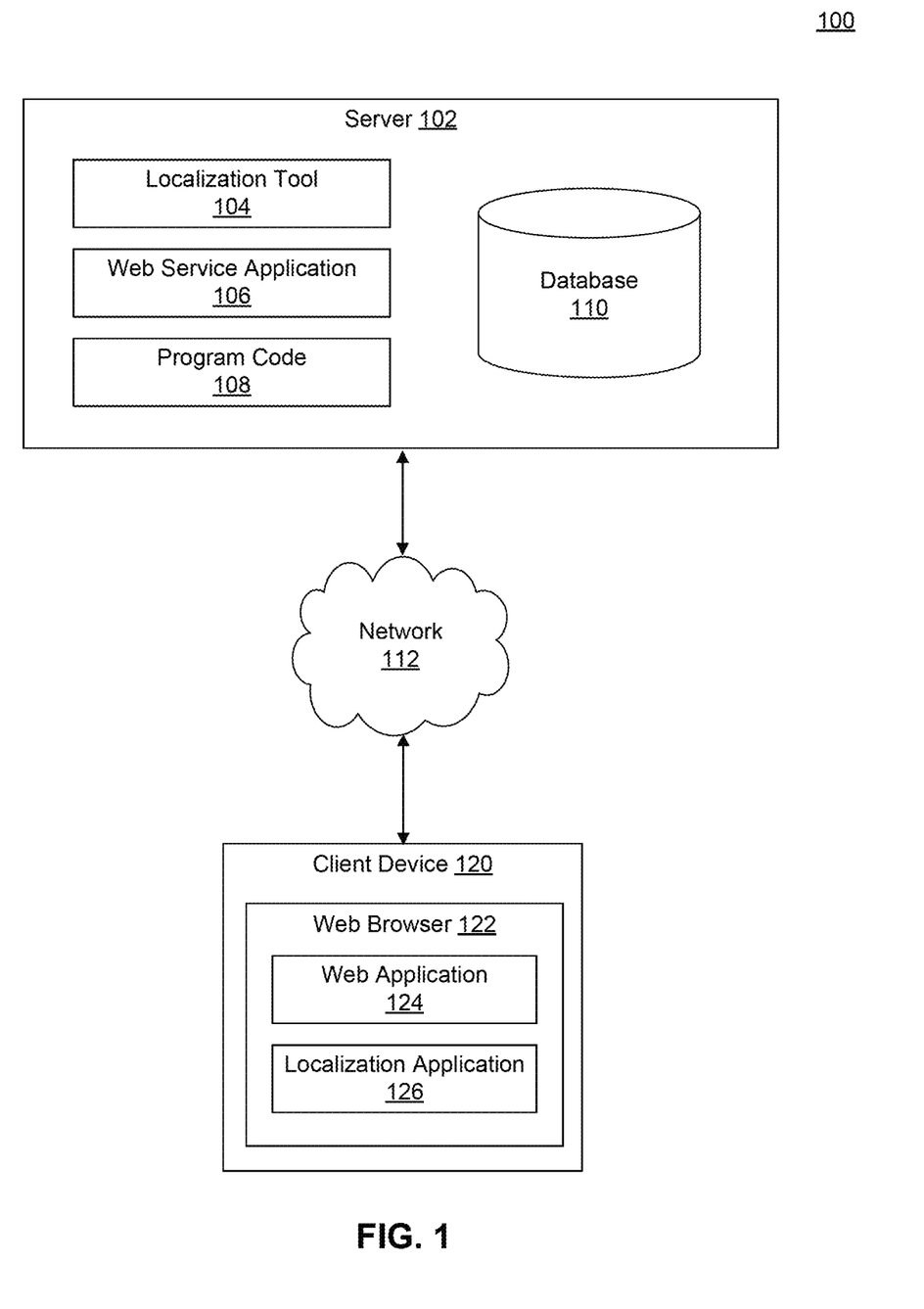
FIG. 1 is a block diagram of an environment of a localization tool, according to some embodiments.

FIG. 1 is a block diagram of environment 100 of a localization tool, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein.

Devices of the environment 100 may interconnect via wired connections, wireless connections, or a combination of wired and wireless connections. Devices of environment 100 may include a computer system 400 shown in FIG. 4, discussed in greater detail below. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Environment 100 may include server 102, network 112, and client device 120. Server 102 may be a server device, such as a host server, a web server, an application server, or a similar device that is capable of communicating with the client device 120 via the network 112.

Network 112 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between server 102 and client device 120.

In some embodiments, server 102 may be an application or web server that hosts one or more applications and/or web services provided to client device 120. Server 102 may include a localization tool 104, web service application 106, program code 108, and a database 110.

Localization tool 104 may be an application that interfaces with a client-side application (e.g., localization application 126) to perform automatic layout anomaly detection for website localization. In some embodiments, the localization tool 104 may generate a first rendering of a localization element on a website. In some embodiments, the localization application 126 in the client device 120 may extract localized text from a localization descriptor for the localization element in program code 108, apply the localized text to the localization element on website, generate a second rendering of the localization element on the website after applying the localized text, identify an anomaly in the localization element displayed on the website by comparing the first and second renderings, and create a visual indicator for display as an overlay outside a visible area of the website, in which a location of the visual indicator corresponds to a location of the anomaly in the localization element displayed on the website.

Web service application 106 may be an application program that is stored on server 102 and delivered over the network 112 through a browser interface on the client device 120. The web service application 106 may provide web services to the client device 120 for accessing websites that are localized by localization tool 104.

Program code 108 may be code comprising software instructions that is executed by hardware to perform operations of localization tool 104, web service application 106, and/or server 102. In some embodiment, the program code 108 may be stored in a memory of the server 102 and may be executed by one or more processors of the server 102.

Database 110 may comprise one or more databases, and may store and organize data used by server 102. In some embodiments, database 110 may be configured to store one or more of translations, property files, resource bundles, and localization descriptors, including key-value pair information and bundle information. In some embodiments, database 110 may a server-side storage and may be configured to store the program code 108 and server files. While only one database 110 is illustrated in FIG. 1 for reference, there may be any number of databases 110 in server 102.

Client device 120 may be a personal digital assistant, desktop workstation, laptop or notebook computer, netbook, tablet, smart phone, mobile phone, smart watch or other wearable, appliance, augmented reality (AR) device, virtual reality (VR) device, part of the Internet-of-Things, and/or embedded system, to name a few non-limiting examples, or any combination thereof. While only one client device 120 is illustrated in FIG. 1 for reference, there may be any number of client devices 120 in environment 100.

In some embodiments, client device 120 may include one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with web pages, forms, applications and other information provided by server 102. For example, the user interface device of client device 120 can be used to perform on-the-fly translations using localization tool 104 in server 102, access data and applications hosted by server 102, perform searches on stored data in database 110, and otherwise allow a user of client device 120 to interact with various GUI pages that may be presented on the user interface of client device 120.

Client device 120 may be associated with a user, such as a translator or a developer performing translations for a website localization. In some embodiments, a user may operate client device 120 to receive a rendered website that has been localized by the localization tool 104 in server 102. In some embodiments, rendering of the website may occur on the client-side in client device 120 or on the server-side in server 102.

Client device 120 includes a web browser 122. The web browser 122 may allow a user of the client device 120 to access and display web pages. The web browser 122 further includes a web application 124 and a localization application 126.

The web application 124 may be an application that is configured to interface with the web service application 106 in server 102. In some embodiments, the web application 124 may be a front-end application for the web service application 106. Additionally or alternatively, the web browser 122 may display one or more websites or web pages.

The localization application 126 may be a front-end application that is associated with the localization tool 104 in server 102. In some embodiments, a user associated with the client device 120 may use the localization application 126 to access and edit translations through localization tool 104 and other resources in database 110.

In some embodiments, the localization application 126 may allow a user to observe locations of detected anomalies in a website layout after localization. In some embodiments, the localization application 126 may also allow a user to edit translations, select resource bundles, manually enter key-value information, perform spell checks, apply sanitization, apply artificial intelligence (AI)-based algorithms to identify translation issues, redraw or interact with visual indicators, or provide other user input for on-the-fly text replacements for correcting translated text in a localized website.

In some embodiments, the localization application 126 may be an application that is integrated into the web browser 122. In some embodiments, the localization application 126 may be installed in the web browser 122 and configured to run on top of a web application 124 or website displayed on the web browser 122. The localization application 126 may be configured to interface with the localization tool 104 in server 102 for automatically detecting layout shifts or anomalies in websites during localization.

In order to detect layout anomalies, the localization application 126 may generate renderings of websites and compare the renderings after localization. In some embodiments, the localization application 126 may generate a first rendering of a localization element on a website. In some embodiments, a first rendering may be a visual representation of how the website may appear on a web browser 122 of the client device 120 when the code 108 is executed. In some embodiments, the localization element on a website may represent any text or user interface elements on the website that are to be localized for users in different locales.

In some embodiments, the localization application 126 may extract localized text from a localization descriptor for the localization element in code for the website. Localization descriptors may include key and value pairs corresponding to localized elements on the website and bundle information indicating locations of each key and value pairs. For example, if a website is translated from English language to German language during a website localization, a localization descriptor may indicate each element that was localized on the website, the corresponding English and German texts, and the location of where the translations are from (e.g., a file name).

In this disclosure, key and value pairs may be referred to herein as key-value information. In some embodiments, a key and value pair may indicate from which key does a value originate and which value was translated to what. In some embodiments, the bundle information may include the location from where the key-value information was taken. For example, a localization descriptor may be represented in JSON or in another suitable human-readable and machine interpretable format. While localization descriptors may take various forms within the context of this disclosure, examples of information in a localization descriptor is displayed below, such as if a website is translated from the English language to the German language during a website localization:

```
{
    "key" : "article.headline",
    "value_from" : "English article headline",
    "value_to" : "Deutsche Artikel Überschrift",
    "bundle" : "/my/package/editorial.properties"
}
```

The localization tool 104 may encode the localization descriptors into unparsed syntax in program code 108 for the website. In some embodiments, the program code 108 may include a markup language, such as Hypertext Markup Language (HTML), Extensible Markup Language (XML), Standard Generalized Markup Language (SGML), or another markup language. In some embodiments, the program code 108 may comprises HTML, and the localization tool 104 may encode the localization descriptors into unparsed syntax, such as using HTML comments. In some embodiments, the localization tool 104 may encode a localization descriptor by using the following notation: <!--{ . . . }-->

The localization tool 104 may then expand an HTML comment by adding opening and closing pseudo tag notations. In some embodiments, the opening and closing pseudo tag notations may indicate starting and ending points, respectively, for the text that is being translated/localized. In some embodiments, the opening and closing pseudo tag notations may be referred to as a pseudo tag pair. In some embodiments, the localization tool 104 may add pseudo tag notations to the localization descriptor encoded in the unparsed syntax by using the following notation:

<!--[translatable-start]{ . . . }--><!--[translatable-end]-->

In some embodiments, the localization descriptor and the localization element may be wrapped by the pseudo tags, such as by the following notation:

<!--[translatable-start]{ . . . }-->English article headline<!--[translatable-end]-->

In some embodiments, the localization tool 104 may perform server-side processing to create a first rendering and injecting or encoding localization descriptors, as well extracting localized text from localization descriptors, generating renderings, and detecting anomalies in the localization element. In additional or alternative embodiments, the localization application 126 in the client device 120 may perform the extraction of localized text from localization descriptors, the generation of renderings, and the detection of anomalies in the localization element, instead of the localization tool 104 performing these steps. In some embodiments, the localization application 126 may extract the text from the localization descriptor using the pseudo tag notations and apply the localized text to the localization element on the website. The localization application 126 may then generate a second rendering of the localization element on the website after the applying of the localized text. In some embodiments, the second rendering of the localization element may provide a visual representation of how the website may appear on a web browser 122 of the client device 120 after the translated text has been implemented by the website.

In some embodiments, the localization application 126 may identify an anomaly in the localization element displayed on the website by comparing the first and second renderings. In some embodiments, an anomaly as described herein may represent a text cutoff, a broken layout, one or more missing images, or a layout change to a localization element as displayed on a website after localization. In some embodiments, the anomaly in the localization element may be a text cutoff of the localized text displayed on the website resulting from a predetermined character limit on the website. For example, the text for a particular localization element may be translated from English to German, and the German translated text may be longer than the English text. In some cases, the translated text for the particular localization element may have a character length that exceeds the predetermined character limit for the website, and the translated text may subsequently be cut off after reaching the predetermined character limit and appended with an ellipsis.

Thus, the full text of the translated text may not be properly displayed in the rendering of the website, preventing users from seeing the complete translation of the text and understanding the fully translated content of the website. In some embodiments, the text cut off may occur on the server-side (in server 102) before it is sent to the browser 122 for display on the client device 120. In some embodiments, the text cut off may occur on the client-side (in client device 120) after the text is sent to the browser 122 for display on the client device 120. In some embodiments, the text cut off on the client-side may occur as a result of a Cascading Style Sheets (CSS) styling of the web page, such as predetermined character limits on the web page.

In some embodiments, the anomaly in the localization element may be a change in layout location of the localization element displayed on the website. For example, the translated text for a particular localization element may cause other text on the web site to shift, resulting in a change in layout location on the website. In some embodiments, the change in layout location of the localization element may be a horizontal and/or or vertical shift of the localization element on the website. In some embodiments, the localization application 126 may identify the anomaly in the website layout by using data comparison tools to compute the differences between the two renderings of the website, before and after localization. In some embodiments, the localization application 126 may perform image analysis of the two renderings of the website to identify if there has been a layout shift, text cut off, missing image, break in the webpage, or other anomalies. In some embodiments, the localization application 126 may apply a combination of image analysis, browser render output analysis, and data comparison techniques to identify anomalies, such as different text lengths across multiple localized variants of the same webpage. Identification of the anomalies by the localization application 126 may allow for additional analysis of such localization-impacted website changes to resolve issues and prevent website disruptions.

After identifying the anomaly, the localization application 126 may create a visual indicator for display as an overlay outside a visible area of the website. In some embodiments, a location of the visual indicator may correspond to a location of the anomaly in the localization element displayed on the website. In some embodiments, the visual indicator may show the location of the anomaly in the localization element to a user of the client device 120.

Figure 2:
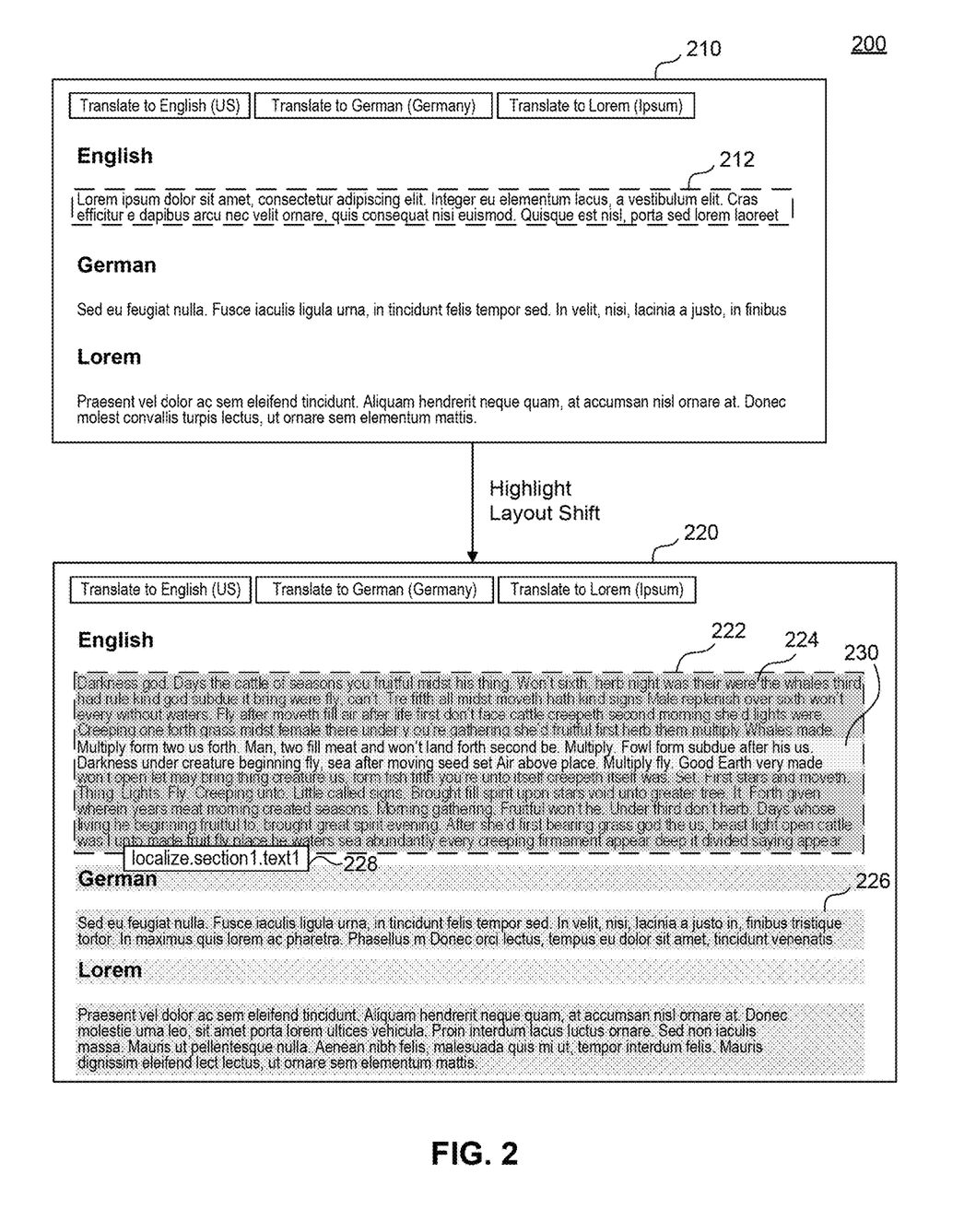
FIG. 2 is a diagram illustrating an example of a layout anomaly detection in a web page performed by the localization tool, according to some embodiments.

FIG. 2 is a diagram illustrating an example 200 of a layout anomaly detection in a web page performed by the localization application 126, according to some embodiments. FIG. 2 illustrates a first web page 210 showing text before localization and a second web page 220 showing the translated text after localization. In some embodiments, the first and second web pages 210 and 220 may be referred to herein as first and second renderings, respectively, of a web page or website. In some embodiments, a rendering of a website may be performed by server 102 and/or client device 120.

The first web page 210 shows an example of a web page that can be localized for different translations, such as English, German, or other languages. The first web page 210 includes a first area 212 that corresponds to the text that is to be translated. In some embodiments, the first area 212 may represent the dimensions or size of the screen occupied by the text that is to be translated or localized.

The second web page 220 shows an example of the web page with the translated text after localization and highlighting of a layout shift, as performed by localization application 126. The second web page 220 includes a second area 222 that corresponds to the translated text of the text in the first area 212 in the first web page 210. In some embodiments, the length of the text in the first area 212 may increase or become longer when translated from a first language to a second language, as shown by the translated text in the second area 222 in the second web page 220. Thus, the dimensions of the second area 222 may be greater than the dimensions of the first area 212, and the translated text in the second area in the second web page 220 may take up more space on the webpage/screen of the client device 120. In other embodiments, the length of the text in the first area 212 may decrease or become shorter when translated from a first language to a second language in the translated text in second area 222, and the dimensions of the second area 222 may be less than the dimensions of the first area 212.

In some embodiments, the localization application 126 may track or monitor the dimensions of the areas of text in localization elements on the web pages 210 and 220 to identify any changes. In some embodiments, the localization tool 104 may compare the dimensions of the first area 212 in the first web page 210 with the dimensions of the second area 222 in the second web page 220. If the dimensions of the first area 212 in the first web page 210 are the not the same as the dimensions of the second area 222 in the second web page 220, then the localization application 126 may determine that there is an anomaly or layout shift in the web pages.

Upon detecting the anomaly or layout shift, the localization application 126 may generate one or more visual indicators to highlight the anomaly or layout shift. The second web page 220 includes visual indicator 224, visual indicator 226, and visual indicator 230. The visual indicators 224, 226, and 230 are generated by the localization application 126 and may be displayed as overlays over different texts on the second web page 220. In some embodiments, the localization application 126 may scale the sizes of the visual indicators 224, 226, and 230 to match the sizes of different text portions on the second web page 220. In some embodiments, visual indicator 224 may be an overlay over the localized text. In some embodiments, visual indicator 224 may highlight or accentuate a change in appearance on the second web page 220 so that the user is made aware of the changes on the second web page 220 after localization. In some embodiments, visual indicator 224 may highlight the translated text in the second area 222 to indicate the change in dimensions of the text as displayed on the screen, in comparison to the text in the first area 212 in the first web page 210.

In some embodiments, the visual indicator 224 may highlight or accentuate a translated/localized text on the second web page 220 to indicate a change in size of the localized text when translated from a first language in first area 212 to a second language in second area 222. In some embodiments, a change in size of the localized text may comprise a change in the length of the text. For example, the length of the text may become longer or shorter when translated from a first language in first area 212 to a second language in second area 222. Thus, the visual indicator 224 may highlight this change in size by providing an overlay on the second web page 220.

In some embodiments, visual indicator 226 may be a second overlay that is displayed over other text on the second web page 220 that may have shifted as a result of the change in appearance of the localized text. For example, the change in size of the localized text may cause the other text on the second web page 220 to shift down on the page. Thus, the visual indicator 226 may indicate this shift by highlighting the portion of the second web page 220 that has shifted.

The second web page 220 may also include a third visual indicator 230, which may identify a location of where an anomaly or shift in text on the second web page 220 occurred. In some embodiments, the visual indicator 230 may provide an overlay over a location of the second web page 220 from where the text highlighted by the visual indicator 226 shifted down. For example, the location of the text "German" and the following paragraphs of text may have shifted down from its original first location in the first web page 210 to a second location in the second web page 220 after localization. Thus, the visual indicator 230 may mark the original first location from where this portion of text shifted down after localization.

In some embodiments, the third visual indicator 230 may be generated as a result of a user interaction that is added to visual indicator 226 by the localization application 126. In some embodiments, a user may operate a cursor (e.g., of a mouse connected to client device 120) to hover over and/or click on the visual indicator 226. Upon receiving this user input from the client device 120, the localization application 126 may generate and display the third visual indicator 230 to indicate the original location from where the text corresponding to the visual indicator 226 was shifted after localization.

In some embodiments, a user may easily identify the changes in the appearance of the second web page 220 after localization by viewing the visual indicators 224, 226, and 230. In some embodiments, the localization application 126 may generate one or more of the visual indicators 224, 226, or 230, or all of the visual indicators 224, 226, and 230 for display over portions of the second web page 220. In some embodiments, the visual indicators 224, 226, and 230 may not affect the style of the second web page 220 itself or change the content of the second web page 200 displayed, but rather the visual indicators 224, 226, and 230 are displayed as overlays to indicate a change in appearance of the second web page 200 after localization to a user.

In some embodiments, the second web page 220 may also include an identifier 228 that is displayed underneath the localized text. The identifier 228 may represent a user interaction that is added to the visual indicator 224 by the localization application 126. In some embodiments, a user may operate a cursor (e.g., of a mouse connected to client device 120) to hover over and/or click on the visual indicator 224. Upon receiving this user input from the client device 120, the localization tool 104 may generate identifier 228, which provides a key or identifier of the localized text that is shown underneath the visual indicator 224. In some embodiments, a user may employ identifier 228 to look up a corresponding translation file and provide changes for the translated text.

Figure 3:
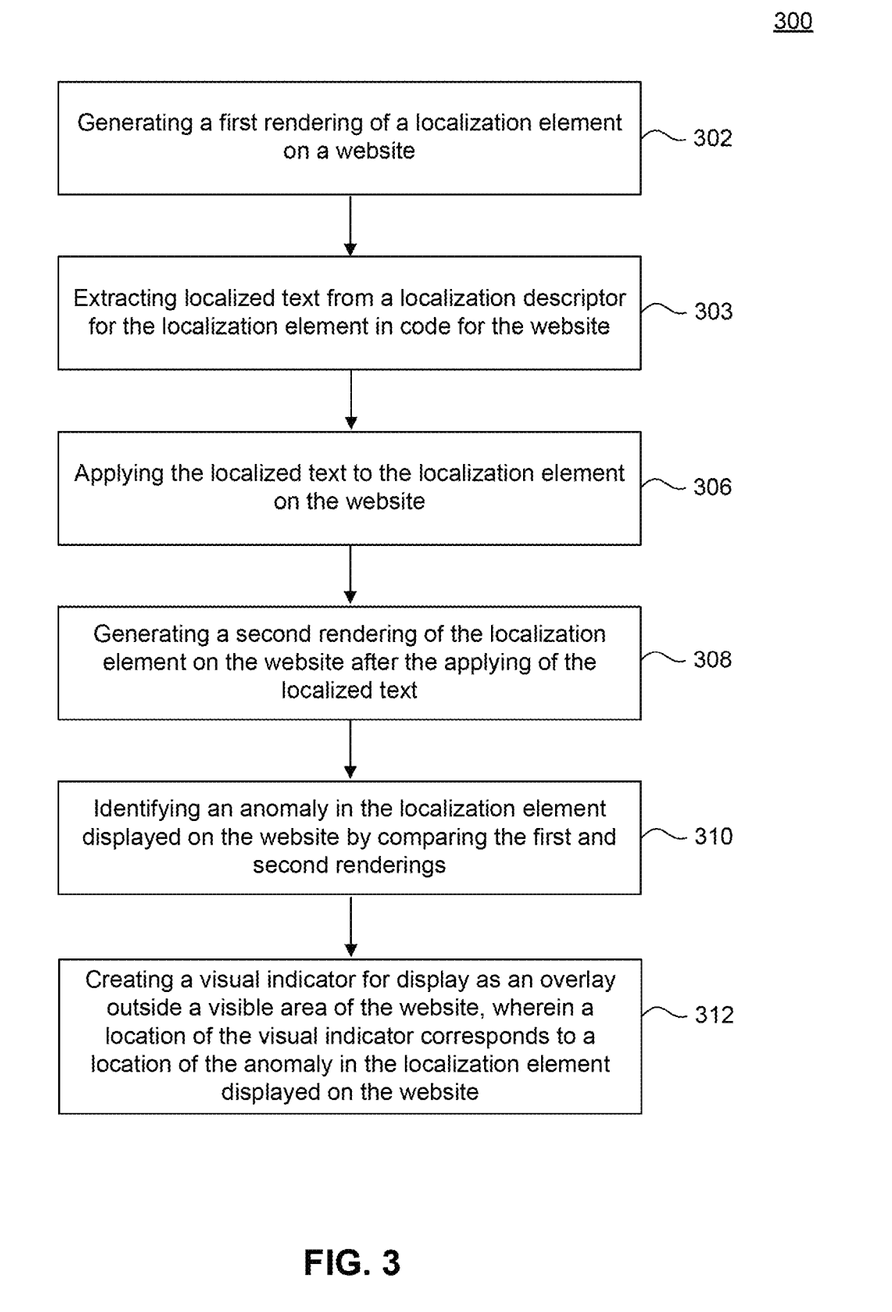
FIG. 3 illustrates a method for performing an automatic layout anomaly detection in website using the localization tool, according to some embodiments.

FIG. 3 illustrates a method 300 for performing an automatic layout anomaly detection in website using the localization tool, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, the localization tool 104 may generate a first rendering of a localization element on a website. In some embodiments, in order to generate the first rendering, the localization tool 104 may generate and inject localization descriptors. In some embodiments, a first rendering may be a visual representation of how the website may appear on a web browser 122 of the client device 120 when the code 108 is executed. In some embodiments, the localization element on a website may represent any text or user interface elements on the website that are to be localized for users in different locales.

In 304, the localization application 126 may extract localized text from a localization descriptor for the localization element in code for the website. In some embodiments, the localization descriptor includes a key and value pair corresponding to the localization element and bundle information indicating a location of the key and value pair. In some embodiments, the localization application 126 may use the key and value pair to extract localized text from the key and value pair from unparsed syntax in code, such as an HTML comment in program code 108.

In 306, the localization application 126 may apply the localized text to the localization element on the website. In some embodiments, the localization application 126 may apply the localized text, such as text that is translated to a different language, to the localization element.

In 308, the localization application 126 may generate a second rendering of the localization element on the website after the applying of the localized text. In some embodiments, the second rendering of the localization element may provide a visual representation of how the website may appear on a web browser 122 of the client device 120 after the translated text has been implemented by the website. In some embodiments, the localization application 126 may take the localized text from the localization descriptor and replace the original text within the web page with the localized text. Replacement of the text may then cause the page to repaint in the web browser, and then an analysis of the first rendering (e.g., first paint) with respect to the second rendering (e.g., second paint) may be performed subsequently.

In 310, the localization application 126 may identify an anomaly in the localization element displayed on the website by comparing the first and second renderings. In some embodiments, the anomaly in the localization element may be a text cutoff of the localized text displayed on the website resulting from a predetermined character limit on the website. In some embodiments, the anomaly in the localization element may be a change in layout location of the localization element displayed on the website. In some embodiments, the change in layout location of the localization element may be a horizontal or vertical shift of the localization element on the website.

In 312, the localization application 126 may create a visual indicator for display as an overlay outside a visible area of the website. In some embodiments, a location of the visual indicator may correspond to a location of the anomaly in the localization element displayed on the website. In some embodiments, the visual indicator may highlight or show the location of the anomaly in the localization element to a user of the client device 120. In some embodiments, the client device 120 may display the visual indicator as an overlay on the website. In some embodiments, the localization application 126 may receive a user input from the client device 120, in which the user input corresponds to the visual indicator displayed as the overlay on the website, and the localization application 126 may generate an output on the website in response to the user input.

Figure 4:
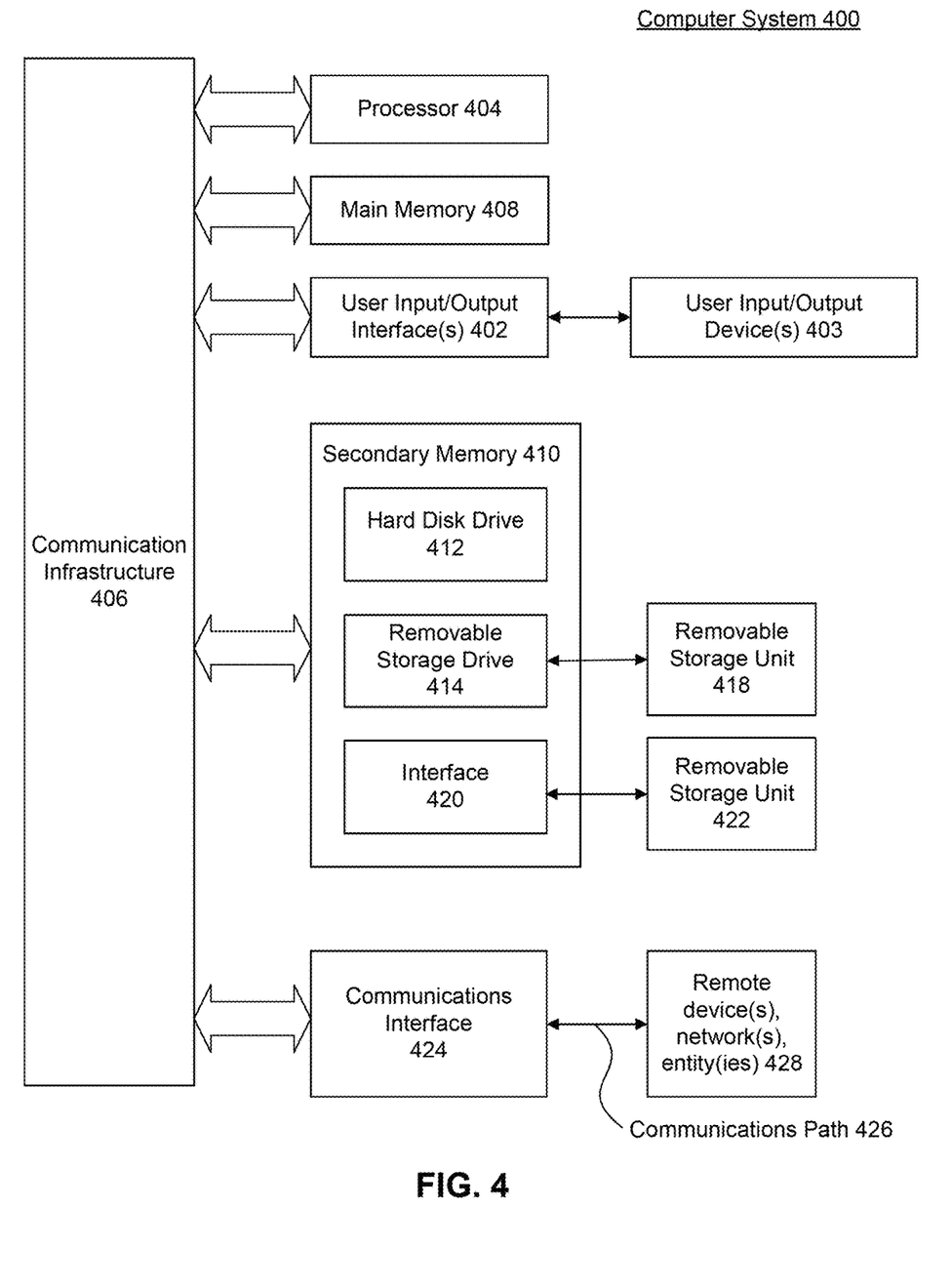
FIG. 4 illustrates a computer system, according to exemplary embodiments of the present disclosure.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 408, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    generating, by at least one processor, a first rendering of a localization element on a website;
    extracting, by the at least one processor, localized text from a localization descriptor for the localization element in code for the website;
    applying, by the at least one processor, the localized text to the localization element on the website;
    generating, by the at least one processor, a second rendering of the localization element on the website after the applying of the localized text;
    identifying, by the at least one processor, an anomaly in the localization element displayed on the website by comparing the first rendering and the second rendering;
    generating, by the at least one processor, a first visual indicator and a second visual indicator for display outside of a visible area of the website, wherein the first visual indicator is a first overlay corresponding to a location of the anomaly in the localization element displayed on the website, and wherein the second visual indicator is a second overlay, displayed over the first visual indicator, corresponding to a shift of the localization element in the location of the anomaly; and
    generating, by the at least one processor, a first output and a second output on the website responsive to a user input corresponding to the first visual indicator and the second visual indicator displayed outside of the visible area of the website.

2. The method of claim 1, wherein the anomaly in the localization element comprises a text cutoff of the localized text displayed on the website resulting from a predetermined character limit on the website.

3. The method of claim 1, wherein the anomaly in the localization element comprises a change in layout location of the localization element displayed on the website.

4. The method of claim 3, wherein the change in layout location of the localization element comprises a horizontal or vertical shift of the localization element on the website.

5. The method of claim 1, further comprising:
    displaying, by the at least one processor, the first visual indicator as the first overlay on the website.

6. The method of claim 5, further comprising:
    receiving, by the at least one processor, a user input from a client device, wherein the user input corresponds to the first visual indicator displayed as the first overlay on the website; and
    generating, by the at least one processor, an output on the website in response to the user input.

7. The method of claim 1, wherein the first output indicates the localized text displayed underneath the first visual indicator, and wherein the second output indicates from where the localized text was shifted after localization corresponding to the second visual indicator.

8. A system comprising:
    a memory; and
    a processor coupled to the memory, wherein the processor is configured to:
        generate a first rendering of a localization element on a website;
        extract localized text from a localization descriptor for the localization element in code for the website;
        apply the localized text to the localization element on the website;
        generate a second rendering of the localization element on the website after the applying of the localized text;
        identify an anomaly in the localization element displayed on the website by comparing the first rendering and the second rendering;
        generate a first visual indicator and a second visual indicator for display outside of a visible area of the website, wherein the first visual indicator is a first overlay corresponding to a location of the anomaly in the localization element displayed on the website, and wherein the second visual indicator is a second overlay, displayed over the first visual indicator, corresponding to a shift of the localization element in the location of the anomaly; and
        generate a first output and a second output on the website responsive to a user input corresponding to the first visual indicator and the second visual indicator displayed outside of the visible area of the website.

9. The system of claim 8, wherein the anomaly in the localization element comprises a text cutoff of the localized text displayed on the website resulting from a predetermined character limit on the website.

10. The system of claim 8, wherein the anomaly in the localization element comprises a change in layout location of the localization element displayed on the website.

11. The system of claim 10, wherein the change in layout location of the localization element comprises a horizontal or vertical shift of the localization element on the website.

12. The system of claim 8, wherein the processor is further configured to:
   display the first visual indicator as the first overlay on the website.

13. The system of claim 12, wherein the processor is further configured to:
   receive a user input from a client device, wherein the user input corresponds to the first visual indicator displayed as the first overlay on the website; and
   generate an output on the website in response to the user input.

14. The system of claim 8, wherein the first output indicates the localized text displayed underneath the first visual indicator, and wherein the second output indicates from where the localized text was shifted after localization corresponding to the second visual indicator.

15. A non-transitory computer-readable device having instructions stored thereon that, when executed by at least one computing device, cause the at least one computing device to perform operations comprising:
   generating a first rendering of a localization element on a website;
   extracting localized text from a localization descriptor for the localization element in code for the website;
   applying the localized text to the localization element on the website;
   generating a second rendering of the localization element on the website after the applying of the localized text;
   identifying an anomaly in the localization element displayed on the website by comparing the first rendering and the second rendering;
   generating a first visual indicator and a second visual indicator for display outside of a visible area of the website, wherein the first visual indicator is a first overlay corresponding to a location of the anomaly in the localization element displayed on the website, and wherein the second visual indicator is a second overlay, displayed over the first visual indicator, corresponding to a shift of the localization element in the location of the anomaly; and
   generating a first output and a second output on the website responsive to a user input corresponding to the first visual indicator and the second visual indicator displayed outside of the visible area of the website.

16. The non-transitory computer-readable device of claim 15, wherein the anomaly in the localization element comprises a text cutoff of the localized text displayed on the website resulting from a predetermined character limit on the website.

17. The non-transitory computer-readable device of claim 15, wherein the anomaly in the localization element comprises a change in layout location of the localization element displayed on the website.

18. The non-transitory computer-readable device of claim 17, wherein the change in layout location of the localization element comprises a horizontal or vertical shift of the localization element on the website.

19. The non-transitory computer-readable device of claim 15, the operations further comprising:
   displaying the first visual indicator as the first overlay on the website;
   receiving a user input from a client device, wherein the user input corresponds to the first visual indicator displayed as the first overlay on the website; and
   generating an output on the website in response to the user input.

20. The non-transitory computer-readable device of claim 15, wherein the first output indicates the localized text displayed underneath the first visual indicator, and wherein the second output indicates from where the localized text was shifted after localization corresponding to the second visual indicator.

* * * * *

UNITED STATES PATENT AND TRADEMARK OFFICE
CERTIFICATE OF CORRECTION

| | | |
|---|---|---|
| PATENT NO. | : 12,306,896 B2 | Page 1 of 1 |
| APPLICATION NO. | : 17/695277 | |
| DATED | : May 20, 2025 | |
| INVENTOR(S) | : Marcus Lenzner | |

It is certified that error appears in the above-identified patent and that said Letters Patent is hereby corrected as shown below:

On the Title Page

Column 1, Item (72), in "Inventors", Line 1, delete "Stadroda" and insert -- Stadtroda --, therefor.

Signed and Sealed this
Twenty-first Day of October, 2025

John A. Squires
*Director of the United States Patent and Trademark Office*